United States Patent [19]
Schonstedt

[11] 3,736,502
[45] May 29, 1973

[54] SERIES STRING FLUX GATE MAGNETIC SENSOR APPARATUS WITH ADDITIVE RESPONSE

[75] Inventor: Erick O. Schonstedt, Reston, Va.

[73] Assignee: Schonstedt Instrument Company, Reston, Va.

[22] Filed: Jan. 28, 1971

[21] Appl. No.: 110,535

[52] U.S. Cl.................324/43 R, 324/41, 340/258 C
[51] Int. Cl.............................................G01r 33/04
[58] Field of Search..................................324/41, 43; 340/38 L, 197, 258 R, 258 C, 258 D

[56] References Cited

UNITED STATES PATENTS

| | | | |
|---|---|---|---|
| 2,916,696 | 12/1959 | Schonstedt | 324/43 R |
| 3,423,674 | 1/1969 | Goldsmith et al. | 324/41 |
| 3,439,264 | 4/1969 | Schonstedt | 324/43 R |
| 3,440,436 | 4/1969 | Oshima et al. | 340/174 TF |
| 3,487,459 | 12/1969 | Schonstedt | 324/43 R |

FOREIGN PATENTS OR APPLICATIONS

| | | | |
|---|---|---|---|
| 700,751 | 12/1953 | Great Britain | 324/41 |

Primary Examiner—Robert J. Corcoran
Attorney—G. Mallet Prevost

[57] ABSTRACT

Multiple-unit, flux-gate, magnetic sensor apparatus in which a single excitation wire passes through the magnetic cores of the sensor units in succession. The signal pickup windings of the units are connected in series, the polarity of certain windings being opposite to that of others for balancing out ambient fields, and DC being supplied to the pickup windings for neutralizing any residual unbalance. A string of magnetic sensor units may be employed in the frame of a doorway for perimeter surveillance to detect magnetic articles such as guns. The units are arranged in pairs, with signal winding polarities selected to produce additive response.

9 Claims, 4 Drawing Figures

INVENTOR
ERICK O. SCHONSTEDT

BY

ATTORNEY

INVENTOR
ERICK O. SCHONSTEDT

BY

ATTORNEY

SERIES STRING FLUX GATE MAGNETIC SENSOR APPARATUS WITH ADDITIVE RESPONSE

BACKGROUND OF THE INVENTION

This invention relates to magnetic sensor apparatus and is more particularly concerned with apparatus for detecting the fields associated with magnetic objects.

Magnetometers and the like have recently assumed increasing importance in the detection of weapons, such as guns, composed of magnetic material. For perimeter surveillance, as in the monitoring of persons passing through a doorway, for example, it is usually necessary to provide a plurality of magnetometer units at spaced locations along the perimeter. A simple string of sensors for such use would be highly desirable, but prior magnetic sensors are unduly complex.

BRIEF DESCRIPTION OF THE INVENTION

It is accordingly a principal object of the present invention to provide improved magnetic sensor apparatus, and in particular, a simple magnetic sensor string comprising a plurality of spaced sensor units.

A further object of the invention is to provide apparatus of the foregoing type in which ambient fields are easily cancelled.

Still another object of the invention is to provide apparatus of the foregoing type in which pairs of sensors produce additive response.

Briefly stated, in a preferred embodiment the apparatus of the invention comprises a plurality of magnetic sensor units, each including a pair of tubular magnetic cores arranged side-by-side within a tubular housing upon which a signal pickup winding is wound. A single excitation wire extends through one core of each unit, extending through the sensors in succession, and then returns through the remaining cores in succession. The polarity of certain signal pickup windings is opposite to that of other pickup windings, so as to balance out the effects of ambient fields and nearby static objects, and DC may be passed through the pickup windings in series to cancel out any residual effects. When the sensor string is used for perimeter surveillance, the sensors may be arranged in pairs at opposite sides of the area to be monitored. The polarity of the signal windings of the units of at least some of the pairs is selected to produce an additive response from those units when a magnetic object passes through the area under surveillance.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 1:
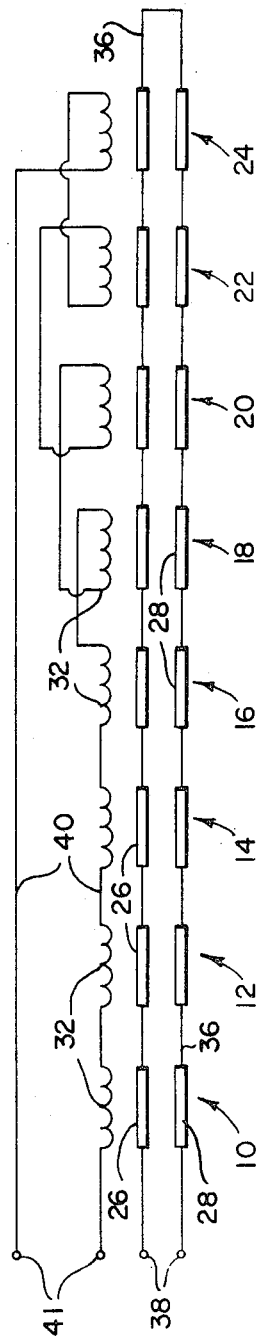
FIG. 1 is a schematic diagram of a magnetic sensor string in accordance with the invention.
Figure 2:
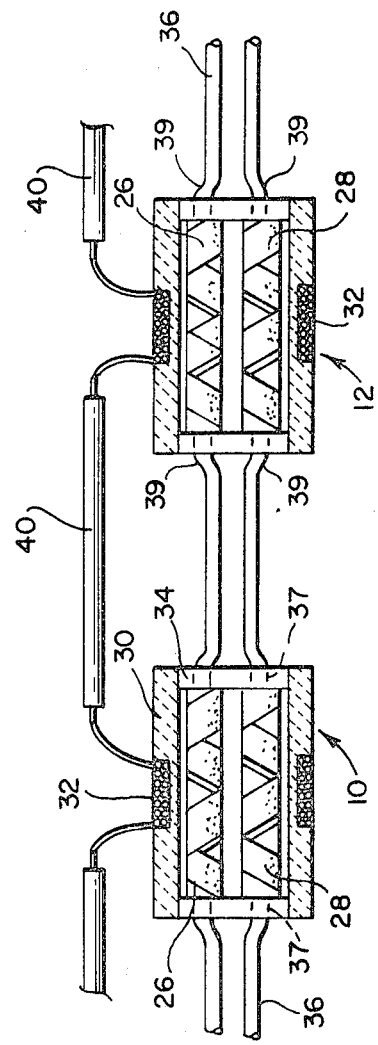
FIG. 2 is a longitudinal sectional view of a portion of the string enlarged to illustrate some of the constructional features.

Referring to the drawings, and initially to FIGS. 1 and 2, the apparatus of the invention comprises a plurality of flux-gate sensor units, such as the units 10–24 shown diagrammatically in FIG. 1. Each unit may comprise, as shown in FIG. 2, a pair of magnetic cores 26 and 28. Each core may comprise a ceramic or other insulating tube supporting a covering of woven Permalloy, as set forth in the applicant's prior U.S. Pat. No. 2,981,885, granted Apr. 25, 1961, or the cores may be constituted by Permalloy wire wound helically as set forth in the applicant's prior U.S. Pat. No. 2,916,696, granted Dec. 8, 1959, or prior U.S. Pat. No. 3,439,264, granted Apr. 15, 1969. Other types of magnetic cores may also be employed. The cores of each sensor unit are arranged side-by-side in a cylindrical housing 30 of insulating material upon which a helical signal pickup winding 32 is wound, as in a circumferential groove upon the outer surface of the housing. The housing is supplied with insulating closure discs 34, which fit within the ends of the housing in abutting relationship with the cores 26 and 28.

A single large diameter excitation wire 36, which may be of the type set forth in the aforementioned U.S. Pat. No. 3,439,264, passes through one core (26) of each sensor unit ( holes 37 being provided in discs 34 ), the wire extending through the sensor units in succession and then being reversely bent, like a hairpin, and extending in succession through the remaining cores of the units, as shown in FIGS. 1 and 2. Excitation current is supplied to terminals 38 at the ends of wire 36. The wire is preferably bent transversely at the outer surface of each end closure disc 34, as shown at 39 in FIG. 2, so as to retain the cores and end closures assembled in proper spaced locations upon the excitation wire, the end closures being cemented or otherwise appropriately fixed to the housings 30. The signal windings 32 are connected in series by signal leads 40 between terminals 41, and as shown in FIG. 1 the signal windings of half of the sensor units have their polarity arranged opposite to that of the other half, so that signals produced by ambient magnetic fields or nearby static objects will be balanced out. As pointed out hereinafter, DC may be passed through all of the signal pickup windings in series for neutralizing any residual unbalance.

Figure 4:
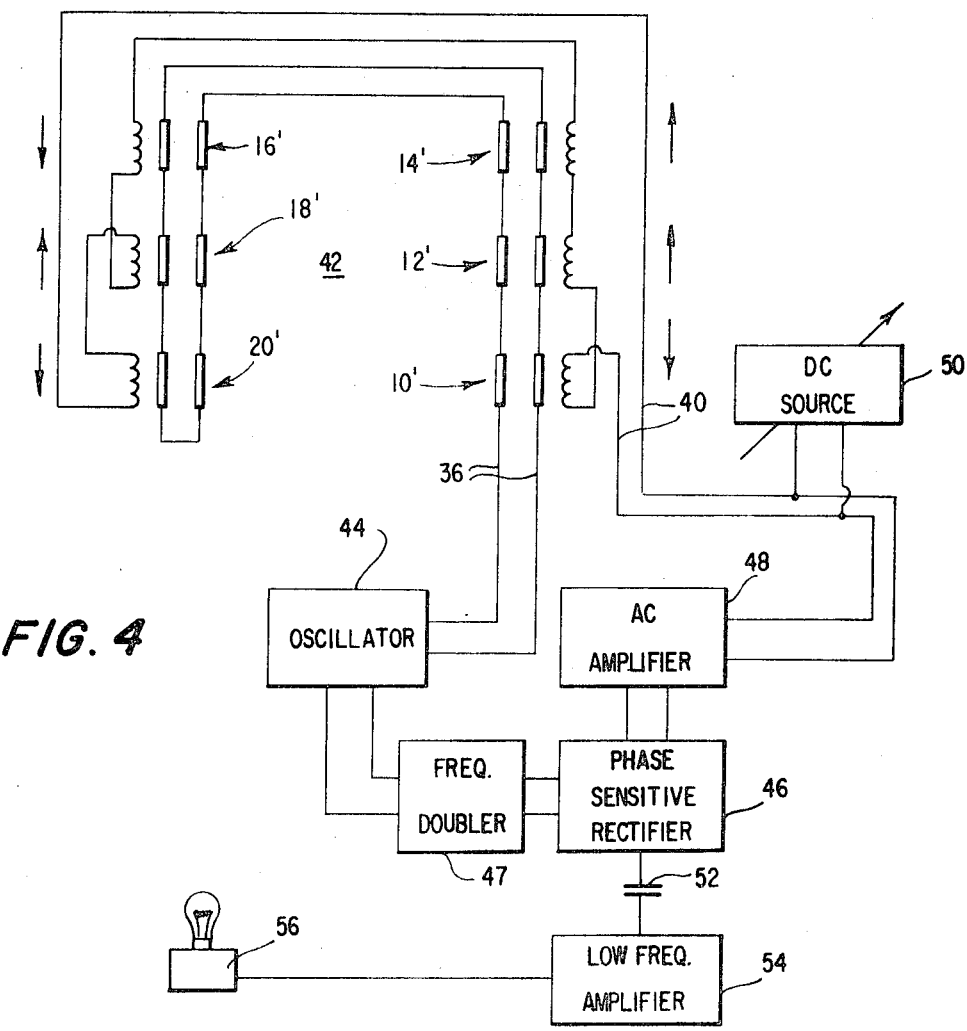
FIG. 4 is a combined block and schematic diagram illustrating the application of the invention to perimeter surveillance.

FIG. 4. illustrates the application of the invention to perimeter surveillance. In this instance the apparatus may be monitoring the perimeter of a doorway 42, six sensor units 10' – 20' being employed on the sensor string, with the sensor units being arranged in pairs, three at one side of the doorway and three at the opposite side. The three pairs of sensors are used for detection in the boot-top, hip, and shoulder ( plus head ) areas, although any appropriate even number of sensors may be employed. The sensor units may be mounted in or upon the doorframe, for example. The arrows adjacent to the sensor units designate the polarity of the signal pickup windings. AC from an oscillator 44 is applied to the excitation wire 36 and is also applied as a reference to a phase-sensitive rectifier or detector 46, the frequency first being doubled by a doubler 47. The signal winding leads 40 are connected to the input of an AC amplifier 48, the output of which is applied as another input to the phase-sensitive rectifier 46. The usual filters and tuning circuits are not shown. An adjustable DC source is shown at 50 connected to the signal winding leads 40 for providing the aforementioned compensation for residual ambient fields. The output of the phase-sensitive rectifier is applied ( as through a capacitor 52 ) to the input of a low frequency amplifier 54, the output of which is connected to a suitable indicator 56, such as a lamp.

Signals produced by the ambient magnetic field in the three sensors associated with downward arrows are cancelled by the signals produced by the ambient magnetic field in the sensors associated with upward arrows, any residual ambient field effects being cancelled by adjustment of the DC source 50, as stated above. The effects of nearby static magnetic objects are also balanced out.

Figure 3:
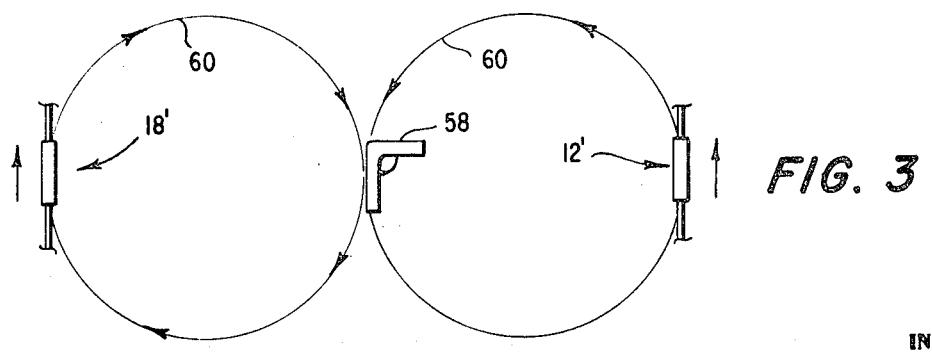
FIG. 3 is a diagrammatic view illustrating the operation of the invention in sensing a magnetic object.

A vertically magnetized object, such as the pistol 58 of FIG. 3 ( which may be magnetized by the earth's field for example ) will have field lines 60 with the directions illustrated in FIG. 3. The field direction is the same at both sensors of any pair, so that if the signal windings have the proper polarity, as shown in FIG. 3, the response to the magnetic object will be additive. If the polarity of the signal winding of one sensor in FIG. 3 were reversed, only the difference in fields at the two sensors would produce an output signal. As is apparent from FIG. 4, the two lower pairs of sensors have the desirable additive characteristic. The upper pair has a differential characteristic, but this pair is in a less critical location.

The apparatus operates generally in accordance with the principles of flux-gate magnetometers, as set forth, for example, in the applicant's prior U.S. Pat. No. 2,916,696, granted Dec. 8, 1959, and the other prior patents cited above. The output for a magnetic object carried through the area monitored will be a low frequency AC between approximately 0.1 cps and 5 cps ( or a slowly varying DC ). Such an output will cause lamp 56 to light.

While preferred embodiments of the invention have been shown and described, it will be apparent to those skilled in the art that changes can be made in these embodiments without departing from the principles of the invention. For example, instead of placing the sensors in a doorframe, the sensors may be placed in a pair of vertical stands or posts, again arranged in pairs, with the wires connecting the sensors in the stands passing beneath a rug or mat. The foregoing embodiments are to be considered illustrative, rather than restrictive of the invention, and those modifications which come within the meaning and range of equivalents of the claims are to be included therein.

The invention claimed is:

1. Magnetic sensor apparatus comprising a plurality of magnetic sensor units, each having an elongted hollow magnetic core surrounded by a signal pickup coil wound about the core, an excitation wire extending through each core only once and extending through said cores in succession, means for supplying excitation oscillations to said excitation wire, and means for responding to signals in said pickup coils due to magnetic disturbances near said sensor units at least a pair of said sensor units being arranged at opposite sides of a region to be monitored, with the pickup coils of said pair connected for producing an additive output therefrom of the same polarity in response to the magnetic field from an object therebetween.

2. Apparatus in accordance with claim 1, there being a plurality of such pairs, with the pickup coils of some of the units of such pairs connected to pickup coils of units of other pairs in phase opposition for balancing out ambient field effects.

3. Apparatus in accordance with claim 2, all of said pickup coils being connected in series.

4. Magnetic sensing apparatus, comprising a plurality of pairs of magnetic sensors, the sensors of each pair being arranged at opposite sides of a region to be monitored, at least one pair having means for producing additive signals of the same polarity in response to a magnetic object therebetween, and some of said sensors having means for compensating for the response of other of said sensors to ambient fields.

5. Apparatus in accordance with claim 4, further comprising means for connecting the signals of said sensors in series, said compensating means comprising connection of the signal of a sensor of one pair in phase opposition to the signal of a sensor of another pair.

6. Apparatus in accordance with claim 4, wherein said sensors are of the type having magentic cores, having excitation wires coupled to said cores and connected in series, and having pickup coils coupled to said cores and connected in series.

7. Apparatus in accordance with claim 6, wherein said sensors are of the flux-gate type.

8. Apparatus in accordance with claim 6, further comprising means for applying direct current to said pickup coils to neutralize residual response to ambient fields.

9. Magnetic sensor apparatus comprising a plurality of magnetic sensor units, each unit incluing an elongated hollow magnetic core contained longitudinally within a cylindrical housing having end closures at opposite ends of the core, an excitation wire extending through said sensor units in succession, said wire passing through both of the end closures and the core of each of said units and being bent laterally at the outer side of each end closure sufficiently to maintain the position of each unit relative to the excitation wire, means for supplying excitation oscillations to said excitation wire, each sensor unit having a pickup coil wound about the housing thereof, and means for responding to signals in said pickup coils due to magnetic disturbances near said sensor units.

* * * * *